United States Patent
La Flame

[15] 3,648,811
[45] Mar. 14, 1972

[54] VISCOUS FLUID CLUTCH
[72] Inventor: Frank E. La Flame, Dayton, Ohio
[73] Assignee: General Motors Corporation, Detroit, Mich.
[22] Filed: June 18, 1970
[21] Appl. No.: 47,448

[52] U.S. Cl. ..........................192/58 B, 192/82 T, 308/122
[51] Int. Cl. .................................F16d 35/00, F16c 13/02
[58] Field of Search ..................192/58 B, 58 C, 82 T, 113 B; 308/122

[56] References Cited

UNITED STATES PATENTS

| | | | |
|---|---|---|---|
| 3,404,832 | 10/1968 | Sutaruk | 192/58 B X |
| 2,680,410 | 6/1954 | Kolb | 308/122 UX |
| 2,902,127 | 9/1959 | Hardy | 192/58 B |
| 2,954,857 | 10/1960 | Palm | 192/58 B |
| 3,007,560 | 11/1961 | Weir | 192/58 B |
| 3,536,175 | 10/1970 | Kawabe et al. | 192/58 B |

Primary Examiner—Allan D. Herrmann
Attorney—Warren E. Finken, A. M. Heiter and John P. Moran

[57] ABSTRACT

A viscous fluid clutch including relatively rotatable drive members having fluid shear spaces therebetween and which are cooperable with a fluid medium in the shear spaces to provide a shear-type fluid drive therebetween, and annular reservoir for at times storing the fluid medium, a temperature-responsive valve for controlling the flow of the fluid medium, a temperature-responsive valve for controlling the flow of the fluid medium from the annular reservoir through an inlet port to the fluid shear space, continually open outlet ports formed in one drive member and cooperating pumping members formed on the other drive member for forcing the fluid medium from the fluid shear spaces to the reservoir, and a sleeve bearing for mounting the outer drive member on a drive shaft, the sleeve bearing including a central chamber and means for permitting the same fluid medium which is used for the viscous shear drive function to enter the central chamber and be dispersed outwardly for causing the fluid medium to lubricate the outer peripheral surface and the end faces of the sleeve bearing under the action of centrifugal force.

4 Claims, 3 Drawing Figures

PATENTED MAR 14 1972

3,648,811

INVENTOR.
Frank E. LaFlame
BY
John P. Moran
ATTORNEY

VISCOUS FLUID CLUTCH

This invention relates generally to variable speed drive devices, and more particularly, to a viscous fluid drive adapted to drive an accessory device, such as a cooling fan, for an internal combustion engine.

Vehicle cooling fans are generally belt-driven from the engine crankshaft, and are operable at a fixed speed ratio with respect to the vehicle engine. It has been found desirable to vary the speed ratio of the fan with respect to the engine speed so that at low engine speed the fan will be running at a relatively high speed for maximum cooling and as the speed of the engine increases, such as when the vehicle is running in direct drive at road speeds, the ram air cooling effect on the engine is increased and the necessity for fan cooling is diminished. The resultant lower fan speed eliminates excessive fan noise which otherwise could be disturbing to the occupants of the vehicle.

The device disclosed herein relates to an engine cooling fan mechanism wherein a viscous fluid, shear-type clutch is utilized to transmit power from the vehicle engine to the fan blade assembly.

An object of the invention is to provide improved means for mounting the clutch assembly on a drive shaft.

Another object of the invention is to provide improved means for lubricating the mounting means with the same fluid medium which is used for viscous shear drive function.

A more specific object of the invention is to provide a viscous shear fan drive having a housing including a rear wall, a front wall, a divider wall or control plate therebetween, an operating or working chamber formed between the rear and divider walls for receiving a pair of spaced-apart drive plates in viscous shear drive relation with the front and rear walls and with an intermediate plate extending inwardly from the housing between the spaced apart drive plates, an annular reservoir formed between the divider and front walls, a continuously open outlet passage formed in the front wall and cooperating pumping means formed on said spaced-apart drive plates for forcing the fluid from the operating chamber through the outlet passage into the reservoir, and a temperature-controlled inlet port formed in the control plate between the operating chamber and the reservoir, and a sleeve bearing mounted in the housing and on a drive shaft adjacent the operating chamber, the sleeve bearing including a central chamber and means for permitting the same fluid medium which is used for the viscous shear drive function to enter the central chamber and be dispersed outwardly for causing the fluid medium to lubricate the outer peripheral surface and the end faces of the sleeve bearing under the action of centrifugal force.

These and other objects and advantages will become apparent when reference is made to the following description and the accompanying drawings, wherein.

Figure 1:
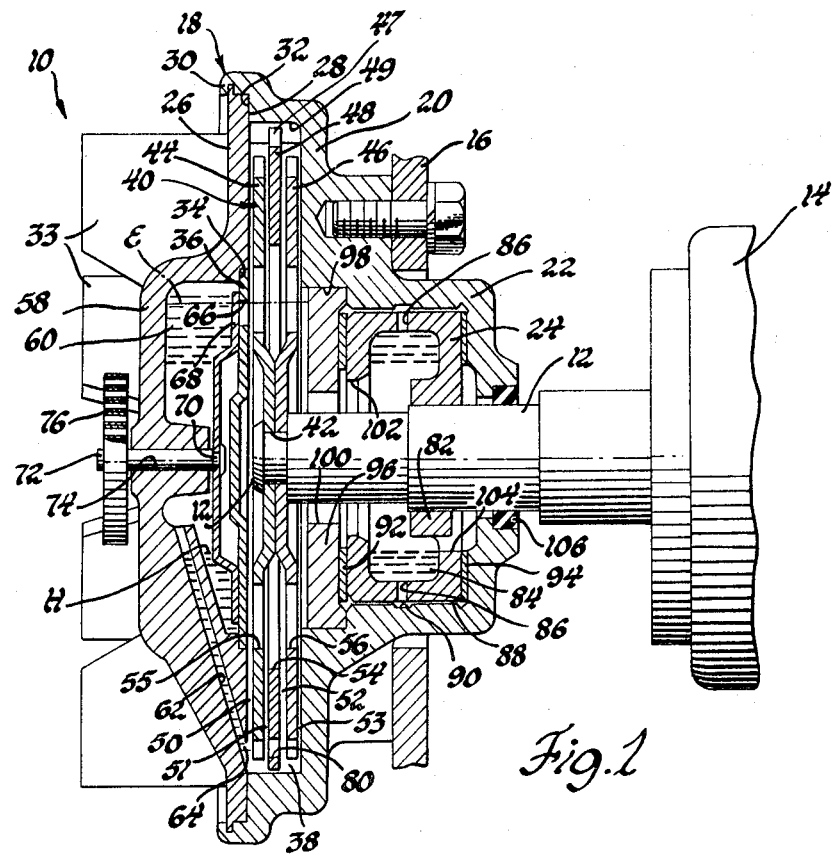
FIG. 1 is a cross-sectional view of a viscous fluid, shear-type clutch embodying the invention.

Referring to the drawings in greater detail, FIG. 1 illustrates a viscous fluid clutch 10 mounted on a drive shaft 12 extending from the conventional water pump 14 and including a cooling fan 16 secured to the clutch 10. The fluid clutch 10 includes a housing 18 which includes a rear wall member 20 having a hub portion 22 which is rotatably mounted on a sleeve bearing 24 on the drive shaft 12. The housing 18 further includes a cover member or front wall 26 which has an annular flat surface 28 formed adjacent its peripheral edge, the latter being confined by an annular lip 30 in an annular recess 32 formed in the housing 18. If desired, cooling fins 33 may be formed on the outside surface of the cover member 26. An annular recess 34 is formed on a radially inward portion of the cover member 26. A divider wall or control plate 36 is secured at its outer edge in the annular recess 34 by any suitable means. The cavity between the rear wall member 20 and the forward wall formed by the cover member 26 and the control plate 36 forms a centrally located operating or working chamber 38. A clutch plate 40 is secured at its center opening 42 by any suitable means to the drive shaft 12, the outer peripheral portion thereof being freely located in the operating or working chamber 38. The clutch plate 40 is formed of two spaced-apart drive plates 44 and 46. A radially inwardly extending plate member 48 is secured to the housing member 20, such as by tabs 47 slidably mounted in slots 49 formed in the housing 20. The plate 48 is located intermediate the spaced-apart drive plates 44 and 46, resulting in respective intervening fluid shear spaces 50, 51, 52, 53 therebetween to accommodate a viscous fluid as a torque-transmitting medium. The intermediate plate member 48 includes a circular inner edge 54 of a predetermined diameter. A plurality of openings 55 and 56 are formed in the drive plates 44 and 46, respectively, radially inward of the inner edge 54 of the plate member 48.

It may be noted in FIG. 1 that the front wall or cover member 26 includes a central hub portion 58 which forms an annular reservoir 60 with the control plate 36. One or more pump outlet passages 62 are formed in the cover member 26 communicating between an outlet port 64 from the working chamber 38 and the annular reservoir 60.

One or more inlet ports or openings 66 are formed in the control plate 36, communicating between the annular reservoir 60 and the working chamber 38 radially inward of the outlet port 64. The inlet port 66 is at times closed off by a valve member 68. The valve member 68 is secured in any suitable manner to a reduced diameter portion 70 of a center pin or shaft 72, which is rotatably mounted in a central opening 74 formed in the hub portion 58 of cover member 26. A helically wound, bimetallic thermostatic valve control element 76 is mounted on the pin 72 such that any change in ambient temperature either winds or unwinds the bimetallic element 76, resulting in rotation of the pin 72 and the valve member 68.

Figure 2:
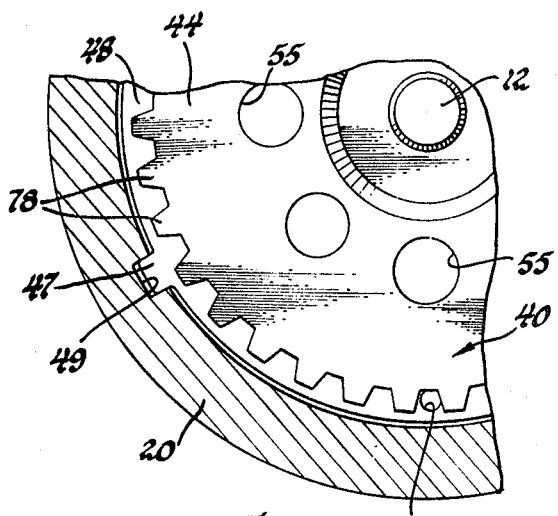
FIG. 2 is an enlarged fragmentary end view of a portion of the FIG. 1 structure.

As illustrated in FIG. 2, a plurality of teeth 78 are formed around the outer peripheral surfaces of the drive plates 44 and 46, serving as pumping members. One or more openings 80 are formed in the intermediate plate 48 adjacent the inner wall of the housing member 20 and radially outwardly of the teeth 78 for permitting the fluid medium to be pumped from the right side (FIG. 1) of the intermediate plate 48 to the left side thereof for transfer to the pump outlet passage 62.

Referring now to the sleeve bearing 24, it may be noted that the latter includes a central hub portion 82 for mounting directly on the shaft 12 and is formed to further include a central chamber 84 having radially extending outlet ports 86 communicating between the chamber 84 and the outer peripheral surface 88 of the sleeve bearing 24. An adjacent annular groove 90 may be formed in the hub portion 22 of the housing member 20. Thrust bearings or washers 92 and 94 may be mounted adjacent the outer faces of the sleeve bearing 24, the sleeve bearing 24 and the thrust washers 92 and 94 being retained axially by a spacer member 96 secured in any suitable manner in a recess 98 formed in the rear wall housing member 20 adjacent the working chamber 38.

The spacer member 96 includes a central opening 100 of a predetermined diameter. An inlet opening 102, the same diameter or slightly larger than that of the opening 100, is formed in the adjacent face of the sleeve bearing 24, leading into the central chamber 84. An inlet passage 104 is formed in the opposite face of the sleeve bearing 24 radially outwardly of the hub portion 82. A seal 106 is mounted just inside the outer face of the hub portion 22 of the rear housing member 20 adjacent the inlet passage 104 to prevent leakage therepast.

OPERATION

So long as the vehicle engine is in operation, the drive shaft 12 and the associated drive plates 44 and 46 will be driven by the engine. The initial position of the temperature-responsive valve member 68 will be closed across the inlet opening 66 in the control plate 36, and will remain closed so long as the engine is cold, thus preventing any flow of fluid from the annular reservoir 60 into the working chamber 38. Since the openings 80 in the intermediate plate 48 and at least one outlet opening 64 in the cover member 58 are always open, providing continuous communication between the working chamber 38 and the annular reservoir 60, fluid from the right-hand (FIG. 1) portion of the working chamber 38 will be pumped through the openings 80, as well as through the plurality of slots 49 in the housing 20, by virtue of the pumping members or teeth 78 on the drive plate 46. The fluid will then be pumped from the left-hand (FIG. 1) portion of the chamber 38 by the pumping members 78 on the other drive plate 44 into the respective pump outlet openings 64 and radially inwardly, against the action of centrifugal force, through the passage 62 to the inner edge thereof, over which it spills into the annular reservoir 60.

The total volume of fluid is such that when the working chamber 38 is substantially empty, the fluid in the annular reservoir 60 will be held under the action of centrifugal force in the outer annular portion of the reservoir 60 with an inner annular liquid level H (FIG. 1). It is apparent that the annular liquid level H is located radially outwardly of the inner edge or opening of the passage 62 and, hence, the wall therebetween will prevent any flow-back of the fluid through the passage 62 and the outlet opening 64 to the working chamber 38. Under this condition, commonly known as the "disengaged mode," slip between the clutch plate 40 and the housing 18 is greatest, and fan speed is correspondingly low, as represented by the curve A of FIG. 3.

As the ambient temperature increases due to the warm-up of the radiator and engine, the bimetallic thermostatic valve control element 76 will begin to wind up, rotating the cooperatively connected pin 72 and the valve member 68, progressively uncovering the inlet ports 66. As a result, fluid will flow through the inlet ports back into the working chamber 38, generally progressively increasing the volume therein with increasing temperature. More specifically, as the fluid is admitted through the inlet ports 66 by the temperature-controlled valve element 76, it will be projected radially outwardly in the shear space 50 between the wall formed by the control plate 36 and the cover member 26 and the adjacent face of the clutch plate 46. While the shear space 50 will be filled first, some fluid will spill through the openings 55 in the drive plate 44 while other fluid will flow radially inwardly between the drive plate 44 and the adjacent face of the intermediate plate 48, the combined flow serving to fill the shear space 51. Once the fluid attains a level radially within the inner edge 54 of the plate 48, it will spill through the opening formed thereby into the shear space 52 between the intermediate plate 48 and the other drive plate 46, and finally filling the fourth shear space 53 by spillage through the openings 56 and radial inward flow therethrough, thus progressively filling the right-hand (FIG. 1) portion of the working chamber 38. The plate 48 may be slidably mounted such that the fluid on the opposing sides thereof will serve to center the plate 48 between the drive plates 44 and 46.

Figure 3:
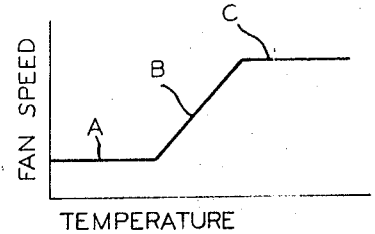
FIG. 3 is a graph illustrating a characteristic of the invention.

As the viscous fluid is admitted to the working chamber 38 with increased temperature, filling the fluid shear spaces 50, 51, 52 and 53, the shear-type fluid drive therebetween will be influenced, and "slip-speed," or the difference between the speed of the clutch plate 40 and that of the housing 20/26, will decrease, with the fan speed progressively increasing, as indicated by curve B of FIG. 3, until all the fluid available to the inlet ports 66 has left the reservoir 60 and the relatively rotating drive members 44, 46/26, 48, 20 are in the so-called fully "engaged mode," after which the fan 16 will rotate at its maximum speed, as represented by curve C of FIG. 3. The liquid level at this point, E of FIG. 1, will be the same in both the reservoir 60 and the working chamber 38. So long as the inlet ports 66 remain open, fluid circulation process will prevail, i.e., the rotating pumping members 78 will continue to promote the flow of fluid from the working chamber 38 through the outlet openings 64 and the passages 62 to the annular reservoir 60 from whence it will continually return to the working chamber 38 via the variable opening inlet ports 66.

As indicated, when the cooling requirements are set at a maximum, the temperature-responsive valve member 68 will have rotated completely past the inlet openings 66, permitting the fluid in the working chamber 38 and the reservoir 60 to reach a point of equilibrium, i.e., liquid level E in FIG. 1, causing the relatively rotatable drive members 40 and 20, 26 to operate at minimum slip-speed and thereby effecting a maximum cooling function, inasmuch as the fan 16 is secured to the outer portion of the rear wall member 20 of the housing 18 (FIG. 1). So long as the inlet ports 66 remain fully open, the circulation process described above will maintain the level E illustrated in FIG. 1.

Consider now that the fan clutch mechanism 10 is stopped. The fluid medium will seek a flat level, as opposed to the annular operational levels, which is above the lower edge of the central opening 100. This permits the supply of fluid serving the sleeve bearing 24 to be replenished in the central chamber 84. Then, once the fan clutch mechanism 10 again becomes operative, the replenished fluid will be projected outwardly, under the action of centrifugal force, through the radial openings 86 for lubricating the outer peripheral surface 88 and the end faces of the sleeve bearing 24.

It is apparent that the invention provides substantial shear area for the efficient operation of the fan clutch mechanism 10, while utilizing the same fluid medium which provides the shear drive for lubrication of an improved bearing arrangement.

While but one embodiment of the invention has been shown and described, other modifications thereof are possible.

I claim:

1. A viscous fluid clutch comprising first and second relatively rotatable drive means, said first drive means having an annular operating chamber and a reservoir chamber, fluid shear drive means associated with said first and second drive means located in said operating chamber forming a shear space therebetween and operable with a fluid medium to provide a shear-type fluid drive between said first and second drive means, said operating chamber having outlet opening means at an outer portion and inlet opening means at an inner portion, pumping means formed on one of said drive means to pump said fluid medium from said operating chamber through said outlet opening means to said reservoir chamber, sleeve bearing means for rotatably supporting said first drive means, said sleeve bearing means including a central chamber, an adjacent annular inlet opening toward said operating chamber for at times communicating a portion of said fluid medium from said operating chamber into said central chamber, and radially extending outlet ports for supplying said fluid medium from said central chamber to the outer periphery of said sleeve bearing means for providing lubrication between said relatively rotating sleeve bearing means and said first drive means under the action of centrifugal force, and a seal mounted in said first drive means adjacent said sleeve bearing means.

2. A viscous fluid clutch comprising first and second relatively rotatable drive members, said first drive member including a first wall, a second wall and a divider wall sealed between said first and second walls providing a working chamber between said divider and second walls and a second chamber between said first and divider walls, fluid shear drive means between said first and second drive members in said working chamber operable with a fluid medium to provide a shear-type fluid drive therebetween, first opening means associated with said divider wall for providing communication from said working chamber to said second chamber, pumping means on said second drive member in cooperation with said rotating first drive member for causing said fluid medium to flow from said working chamber through said first opening means to said second chamber, ambient temperature-responsive opening means formed in said divider wall for communicating said fluid medium from said second chamber to said working chamber on the side of said second drive member adjacent said divider wall, a plurality of openings formed in said second drive member equidistant from the center thereof for permitting said fluid medium to spill over from said side of said second drive member adjacent said divider wall to said side of said second drive member adjacent said second wall, and a sleeve bearing for supporting said first drive member, said sleeve bearing including a central chamber, front and rear inlet openings into said central chamber and radially extending outlet ports from said central chamber, said front inlet opening serving to admit fluid from said working chamber to said central chamber when said viscous fluid clutch is inoperative and said radially extending outlet ports serving to permit said fluid to be projected outwardly under the action of centrifugal force to lubricate the outer peripheral and end surfaces of said sleeve bearing when said viscous fluid clutch is operative.

3. A viscous fluid clutch comprising first and second relatively rotatable drive members, said first drive member including front and rear walls and defining a fluid cavity therebetween, a control plate sealed between said front and rear walls in said fluid cavity, forming a solid wall with an intermediate portion of said first drive member and dividing said fluid cavity into first and second chambers, said second drive member including first and second spaced-apart annular plates and being rotatable in said first chamber, a third plate mounted on said first drive member in said first chamber and extending intermediate said first and second spaced-apart plates, said first annular plate and said solid wall and said third plate and said second annular plate and said third plate and said rear wall having respective opposed spaced parallel surfaces defining fluid shear spaces therebetween and cooperable with a fluid medium therein to provide a shear-type fluid drive between said first and second relatively rotatable drive members, a first opening formed in said third plate for providing communication between the radially outermost portions of said first chamber, a second opening formed in said solid wall for providing communication between said first chamber and said second chamber, a plurality of pumping elements formed on the outer peripheries of said first and second annular plates adjacent said first and second openings for causing said fluid medium to flow through said first and second openings for varying the volume of said fluid medium in said shear spaces to vary the torque transmitted between said first and second drive members, a third opening formed in said control plate for at times communicating said fluid medium from said second chamber to said first chamber, valve means for controlling the flow of said fluid medium through said third opening to further vary the torque transmitted between said first and second drive members, and a sleeve bearing for supporting said first drive member, said sleeve bearing including a central chamber, front and rear inlet openings into said central chamber and radially extending outlet ports from said central chamber, said front inlet opening serving to admit said fluid medium from said first chamber to said central chamber when said viscous fluid clutch is inoperative and said radially extending outlet ports serving to permit said fluid medium to be projected outwardly under the action of centrifugal force to lubricate the outer peripheral and end surfaces of said sleeve bearing when said viscous fluid clutch is operative.

4. The viscous fluid clutch described in claim 3, and bimetallic thermostat means for actuating said valve means.

* * * * *